United States Patent
Chiquet et al.

(10) Patent No.: US 11,435,450 B2
(45) Date of Patent: Sep. 6, 2022

(54) MONOSTATIC LASER RANGEFINDER DEVICE

(71) Applicant: SENSUP, Cesson Sevigne (FR)

(72) Inventors: Frederic Chiquet, Rennes (FR); Gwenn Pallier, Chantepie (FR); Guillaume Canat, Perros Guirec (FR); Marc Le Flohic, Pleumeur Bodou (FR)

(73) Assignee: SENSUP, Cesson Sevigne (FR)

( * ) Notice: Subject to any disclaimer, the term of this patent is extended or adjusted under 35 U.S.C. 154(b) by 939 days.

(21) Appl. No.: 16/130,483

(22) Filed: Sep. 13, 2018

(65) Prior Publication Data
US 2019/0079169 A1     Mar. 14, 2019

(30) Foreign Application Priority Data
Sep. 13, 2017 (FR) .................................... 1758501

(51) Int. Cl.
*G01S 7/481* (2006.01)
*G01S 17/10* (2020.01)
(Continued)

(52) U.S. Cl.
CPC .......... *G01S 7/4818* (2013.01); *G01S 7/4812* (2013.01); *G01S 17/10* (2013.01); *G02B 6/02* (2013.01);
(Continued)

(58) Field of Classification Search
None
See application file for complete search history.

(56) References Cited

U.S. PATENT DOCUMENTS

| 8,104,974 B1 * | 1/2012 | Gurreri | G02B 6/382 |
| | | | 385/72 |
| 8,730,456 B2 | 5/2014 | Goldberg et al. | |

(Continued)

FOREIGN PATENT DOCUMENTS

FR      2954526 A1    6/2011

OTHER PUBLICATIONS

Ping Yan, Fiber core mode leakage induced by refractive index variation in high-power fiber laser (Year: 2017).*
(Continued)

*Primary Examiner* — Yuqing Xiao
*Assistant Examiner* — Jempson Noel
(74) *Attorney, Agent, or Firm* — David D. Brush; Westman, Champlin & Koehler, P.A.

(57) ABSTRACT

A monostatic laser rangefinder device including: a laser light source; a photodetector; a double-clad optical fiber coupled to a collimating and focusing device; and an optical fiber diplexer. The diplexer includes a first optical fiber forming an input port and a second, multimode optical fiber forming a first output port. The first fiber is coupled to the laser source, the second fiber is coupled to the photodetector, and the double-clad fiber forms a second output port. A numerical aperture of a light guide formed of an inner and outer cladding of the double-clad fiber is less than or equal to 0.5, and greater than 0.1. The end of the double-clad fiber facing the collimating and focusing device has a face inclined with respect to an axis perpendicular to the axis of the fiber by an angle greater than or equal to half of the arcsine of the numerical aperture.

14 Claims, 3 Drawing Sheets

Figure 1:
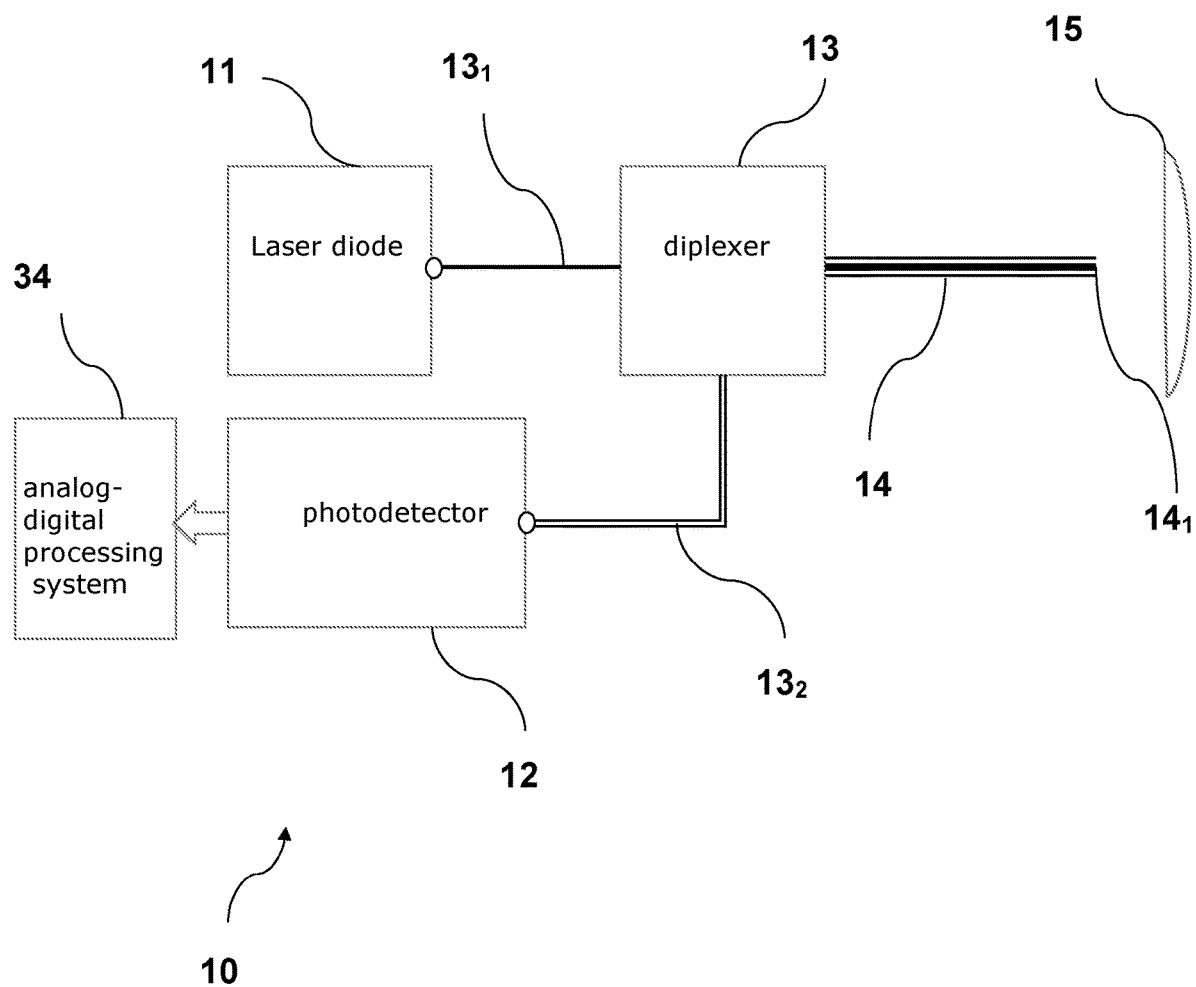

(51) Int. Cl.
G02B 6/02 (2006.01)
H01S 3/094 (2006.01)

(52) U.S. Cl.
CPC .... G02B 6/02357 (2013.01); H01S 3/094003 (2013.01)

(56) References Cited

U.S. PATENT DOCUMENTS

| | | | | |
|---|---|---|---|---|
| 9,933,571 | B2* | 4/2018 | Murgatroyd | G02B 6/25 |
| 2009/0128798 | A1* | 5/2009 | Danziger | G01S 7/4815 |
| | | | | 356/5.01 |
| 2012/0154783 | A1 | 6/2012 | Goldberg et al. | |
| 2013/0255055 | A1* | 10/2013 | Murgatroyd | G02B 6/25 |
| | | | | 29/419.1 |
| 2014/0168631 | A1 | 6/2014 | Haslim et al. | |
| 2014/0231647 | A1* | 8/2014 | Chinn | G01S 7/486 |
| | | | | 250/338.4 |
| 2017/0155225 | A1* | 6/2017 | Villeneuve | G01S 17/88 |

OTHER PUBLICATIONS

V. Filipov, Double clad tapered fiber for high power applications (Year: 2008).*
Supriyo Sinha, Investigation of the suitability of silicate bonding for facet termination in active fiber devices (Year: 2007).*
Wendy-Julie Madore et al. "Asymmetric double-clad fiber couplers for endoscopy." Optics Letters, vol. 38, No. 21. Nov. 1, 2013.
BSI Standards Publication. "Saftey of laser products: Part 1: Equipment classification and requirements." BS EN 60825-1:2014. Aug. 31, 2014.
French Search Report dated Jun. 14, 2018 for corresponding French Application No. 1758501, filed Sep. 13, 2017.
English translation of the French Written Opinion dated Jun. 14, 2018 for corresponding French Application No. 1758501, filed Sep. 13, 2017.

* cited by examiner

MONOSTATIC LASER RANGEFINDER DEVICE

1. CROSS-REFERENCE TO RELATED APPLICATION

This Application claims priority to and the benefit of FR2017/058501, filed Sep. 13, 2017, the content of which is incorporated herein by reference in its entirety.

2. FIELD OF THE INVENTION

The field of the invention is that of telemetry.

More specifically, the invention relates to a monostatic laser rangefinder device.

The invention finds particular application in the embodiment of 3D LIDAR sensors (acronym for "light detection and ranging") with a range of a few hundred metres to about 10 kilometres.

3. STATE OF THE ART

It is known to use single-channel laser rangefinders, also commonly called monostatic laser rangefinders, to detect objects several kilometres apart.

An advantage of these monostatic laser rangefinders is that they are easier to adjust during manufacture. Indeed it is sufficient to adjust a single optical system because the emission and reception of the beam are performed through the same optics. Moreover, since they only have one optics, they are lighter than two-channel, so-called bistatic laser rangefinders.

In order to simplify the embodiment of monostatic laser rangefinders, U.S. Pat. No. B2-8,730,456 suggests to use a diplexer coupled to a laser light source and a photodetector. In this document, the diplexer can be obtained by making a coupler from a double-clad fiber and a multimode optical fiber, by fusion of a portion of the double-clad fiber with a portion of the multimode optical fiber.

A disadvantage of this monostatic laser rangefinder technique, however, results from leakage of the transmission channel to the reception channel, generated in particular by Fresnel reflection, of the order of 4%, on the output face of the double-liner optic fiber of the diplexer. These leaks cause a glare of the photodetector, which is saturated, which prevents the detection of pulses by the photodetector for a few tens to hundreds nanoseconds, or even may cause the destruction of the photodetector and/or the transimpedance amplifier circuit connected to the photodetector. This is why, in order to avoid the risks of glare of the photodetector, the power of the light source of this type of range finder is limited, which consequently limits the maximum signal-to-noise ratio and the extinction rate of the rangefinder, or in other words its range.

In order to allow the rangefinder to capture a large amount of light, while limiting the risks of glare of the photodetector, U.S. Pat. No. B2-8,730,456 proposes to cleave the free end of the double-clad optical fiber at an angle to a direction perpendicular to its axis which is substantially zero, and to apply an antireflection treatment to the free end of the double-clad optical fiber.

Obtaining a double-clad optical fiber whose end is perfectly perpendicular to its axis is however in practice very difficult to implement, and the cleave angle obtained ranges most often between 0.1 and 2°. However, a cleave angle close to 0° causes a spurious return of a substantial part of the light emitted into the core of the double-clad fiber, which risks damaging the laser source. Moreover, if the cleave angle is small but greater than about 1°, a significant fraction of the optical beam reflected on the cleaved free end of the double-clad optical fiber is not coupled in the core but in the inner cladding. After crossing the diplexer, it couples in the detection path and may damage the detector.

4. SUMMARY OF THE INVENTION

An exemplary embodiment of the present disclosure relates to a monostatic laser rangefinder device comprising:
 a laser light source;
 a photodetector;
 a double-clad optical fiber coupled to an optical device for collimating an outgoing beam and focusing a beam entering said laser rangefinder device, said double-clad optical fiber having a core of average refractive index $n_1$, an inner cladding of refractive index $n_2$, an outer cladding of refractive index $n_3$, where $n_1 < n_2 < n_3$;
 an optical fiber diplexer capable of separating the light emitted by said light source, intended to be transmitted to the core of said double-clad optical fiber, from the light propagates in the inner cladding of said double-clad optical fiber, intended to be transmitted to said photodetector, comprising:
  a first optical fiber forming an input port of said diplexer,
  a second optical fiber forming a first output port of said diplexer, said second optical fiber being multimode,
 said first optical fiber being coupled to said laser source and said second optical fiber being coupled to said photodetector and said double-clad optical fiber forming a second output port of said diplexer;
  a processing system for processing the current generated by said photodetector from light received by said photodetector, configured to provide a distance from said generated current.

According to an exemplary embodiment of the invention, the numerical aperture of the light guide formed of the inner cladding and the outer cladding of the double-clad fiber is less than or equal to 0.5, preferably less than or equal to 0.3, and greater than 0.1 and the end of said double-clad fiber facing said collimating and focusing device has a face inclined with respect to an axis perpendicular to the axis of the fiber by an angle greater than or equal to half of the arcsine of said numerical aperture.

Thus, in an unprecedented manner, an exemplary embodiment of the invention suggests, unlike document U.S. Pat. No. B2-8,730,456, beveling the end of the double-clad fiber facing the collimating and focusing device at an angle of a significant value with respect to the perpendicular to the axis of the double-clad optical fiber, sufficient for only a reduced part of the beams reflected by the collimating and focusing device to return to the inner cladding of the double-clad optical fiber while retaining adequate power.

Figure 4:
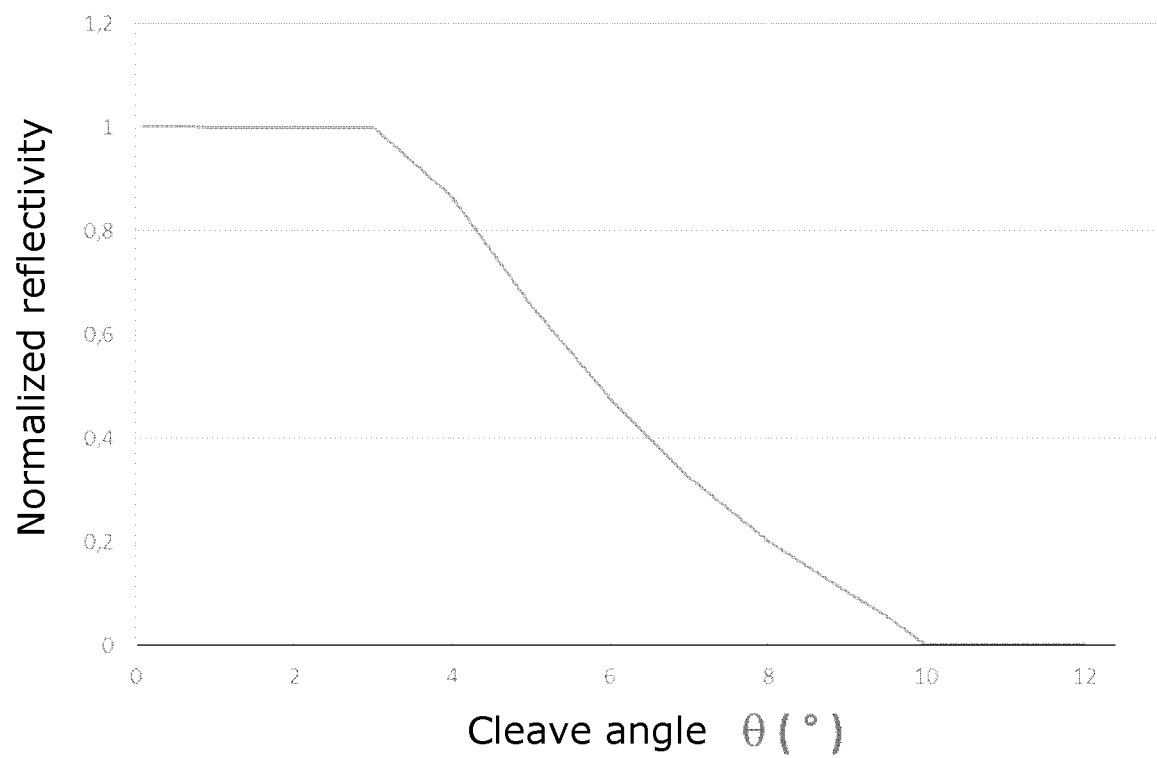

It should be noted, as shown in FIG. 4, in the case of a double-clad optical fiber with a numerical aperture of the inner cladding equal to 0.22, that the power coupled by reflection of the light coming from the core of a double-clad optical fiber towards the inner cladding of the double cladding decreases rapidly with the cleave angle θ. It is already reduced by 50% from about half of the arcsine of the numerical aperture of the inner cladding.

In particular embodiments of the invention, the numerical aperture of the light guide formed of the inner cladding and the outer cladding of the double-clad fiber may range between 0.1 and 0.35, between 0.1 and 0.37, between 0.1 and 0.4, between 0.1 and 0.42 or between 0.1 and 0.45.

In a particular embodiment of the invention, said angle is greater than or equal to 8°.

The embodiment of such an angle is easy in practice.

According to an advantageous embodiment of the invention, said numerical aperture is less than 0.22 and in that said angle is greater than or equal to 6.5°.

According to one particular aspect of an exemplary embodiment of the invention, said end of said double-clad optical fiber is cleaved or polished, or is formed of a connector mounted on said double-clad optical fiber.

Advantageously, said photodetector and/or the transimpedance amplifier circuit with an operational amplifier intended to amplify the current generated by said photodetector comprises a current limiter for limiting the generated current.

For optimum performance, the processing system can advantageously add, or average, the photocurrents of a high number N of pulses, typically one hundred. Once this accumulation has been achieved, detection algorithms such as a maximum detection algorithm after thresholding or a generalised likelihood test can be used to sort out echoes and false alarms.

Advantageously, said processing system is configured to subtract from the current generated by said photodetector a predefined current value belonging to the group comprising at least:

a constant current value;

a current value proportional to the current generated by spurious reflections.

In an exemplary embodiment of the invention, said optical collimation device comprises a thin lens, an aspheric lens or a diffractive optical element such as a Fresnel lens.

It will be noted that the Fresnel lens is particularly advantageous because it has limited space requirements.

The result is a rangefinder device easy to implement and inexpensive.

Advantageously, said laser light source comprises at least one laser diode capable of emitting light pulses in the wavelength band from 1530 to 1600 nm.

It is thus possible to amplify the light beam emitted by the diode using an Erbium doped fiber amplifier or an Ytterbium Erbium doped fiber amplifier.

According to another embodiment, said laser light source comprises at least one laser diode capable of emitting light pulses in the wavelength band from 970 to 1100 nm.

It is thus possible to amplify the light beam emitted by the diode using an Ytterbium doped fiber amplifier.

According to an advantageous aspect of an exemplary embodiment of the invention, said photodetector comprises a photodiode which is fiber-based with a multimode fiber, operating in photoconductive mode or in avalanche mode.

The result is a rangefinder device easy to implement and inexpensive.

Preferably, said end of said double-clad optical fiber is antireflection-treated for the emission wavelength(s) of said laser light source.

Preferably the antireflection treatment implemented reduces the backscattered power by a factor of 4 to 20.

According to a particularly advantageous embodiment of the invention, said diplexer comprises a coupler obtained by melting stretching said double-clad optical fiber with said second optical fiber.

In a particular embodiment of the invention, said laser light source is arranged to emit streams of a number N of pulses per burst and said monostatic laser rangefinder device comprises a controller for controlling said laser light source configured to automatically reduce the number N of pulses in the case where the signal-to-noise ratio calculated by said processing system is greater than a first predetermined threshold for increasing the measurement frequency, and so as to increase automatically the number N of pulses within the limits of the specifications required to guarantee eye safety conditions, in the case where said signal-to-noise ratio is less than or equal to a second predetermined threshold.

In other words, the number N of pulses per burst is automatically adjusted by the controller to guarantee the maximum possible measurement frequency for a constant signal-to-noise level and a mean power limited by the constant ocular safety conditions.

5. LIST OF FIGURES

Figure 2:
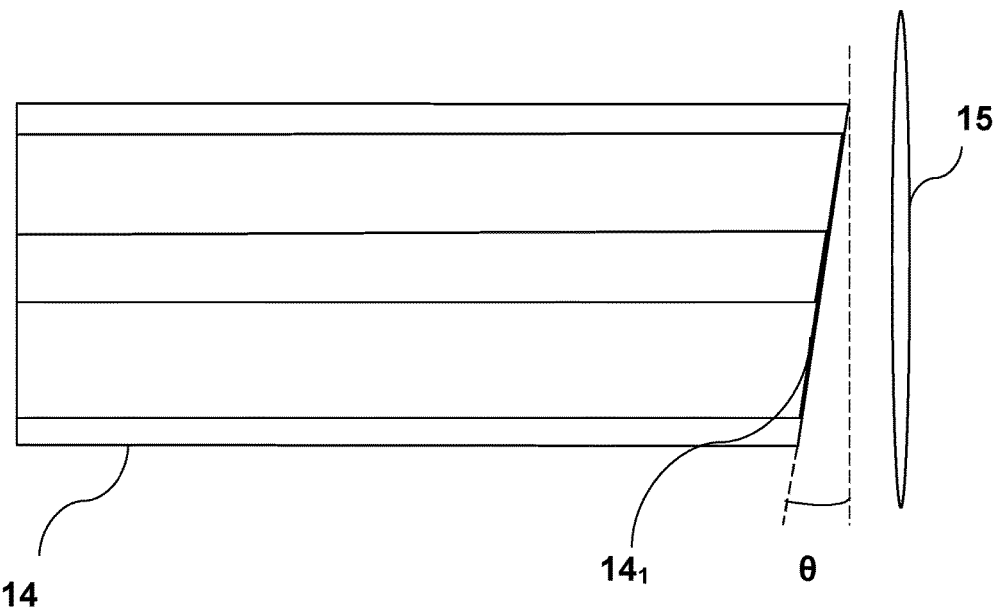
Figure 3:
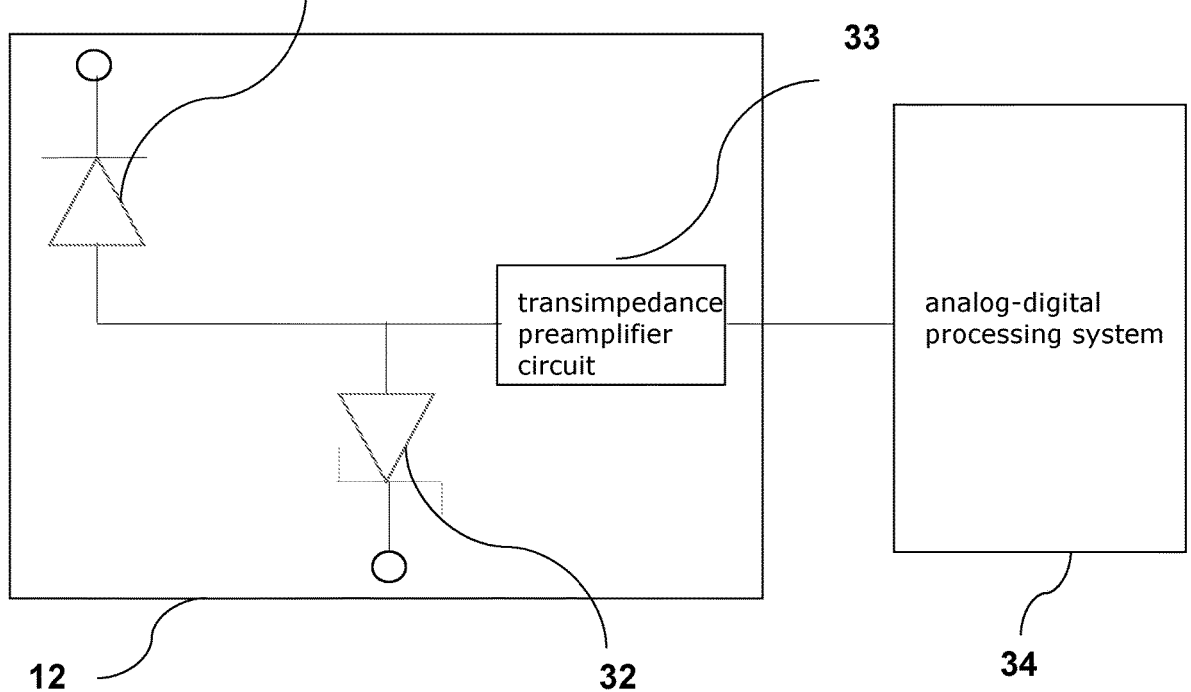

Other features and advantages will appear more clearly on reading the following description of an embodiment of the invention, given as a simple illustrative and non-limiting example, and the appended drawings among which:

FIG. 1 schematically represents the architecture of an exemplary embodiment of a monostatic laser rangefinder device according to an exemplary embodiment of the invention;

FIG. 2 is a detailed view of the free end zone of the double-clad optical fiber of the monostatic laser rangefinder device presented with reference to FIG. 1;

FIG. 3 details the constitution of the photodetector of the monostatic laser rangefinder device presented with reference to FIG. 1;

FIG. 4 illustrates the variation of the coupled power by reflection of the light coming from the core of a double-clad optical fiber with numerical aperture of the inner cladding equal to 0.22 towards the double cladding of this same optical fiber as a function of the cleave angle of the end of this double-clad optical fiber.

6. DETAILED DESCRIPTION OF THE INVENTION

6.1 Exemplary Embodiment of the Invention

FIG. 1 illustrates in schematic form an exemplary embodiment of a laser rangefinder device 10 according to the invention.

The device 10 comprises a fiber-based laser diode 11 and a photodetector 12 coupled respectively to an input and an output of a diplexer 13, the other output of the diplexer 13 being formed of a portion of a double-clad fiber 14 coupled to a thin lens 15 for collimating the outgoing light beam from the core of the double-clad optical fiber 14 and focusing the light beam captured by the lens 15 on the free end $14_1$ of the double-clad optical fiber 14.

In this particular embodiment of the invention, the laser diode 11 is intended to emit pulses with a duration of 10 ns, with a 1550 nm wavelength and a 20 mW peak power, amplified by two optical fibers, doped Erbium amplifiers, respectively (not shown in FIG. 1), with a mode diameter equal to 11 μm, so as to reach an 8 kW peak power at output of the light source.

The photodetector 12 is, in this particular embodiment of the invention, advantageously constructed around a photodiode operating in avalanche mode, with a bandwidth of about 100 MHz and a 10-internal gain. As can be seen in FIG. 3, this photodiode 31 is connected to a transimpedance pre-amplifier circuit with an operational amplifier 33 mounted closest thereto in order to maximize the signal-to-noise ratio. A Zener diode 32 connected to the ground, making it possible to limit the current in the transimpedance preamplifier circuit, is also mounted as a bypass between the photodiode 31 and the transimpedance preamplifier circuit 33, which limits the time during which the photodetector is glared by less than 200 ns. An analog-digital processing system 34 for converting the current emitted by the photodiode into a value representative of the distance separating the rangefinder device from its target, is further connected to the output of the transimpedance preamplifier circuit. It should be noted that a large number of acquisitions of consecutive pulses (e.g. up to 190) are averaged in order to increase the signal-noise ratio at the output of the measurement chain. The processing system 34 includes an electrical circuit, which can be implemented in hardware or a combination of hardware and software, such as but not limited to integrated or discrete analog and/or digital devices and/or a processor configured by software code instructions executable by the processor and stored on a non-transitory computer-readable medium. The input of the diplexer 13 is formed of a first optical fiber $13_1$, welded to the fiber of the second amplifier of the light source, so as to limit losses. The output $13_2$ of the diplexer coupled to the photodetector 12 is formed of a second multimode type optical fiber, welded to a multimode optical fiber coupled to the photodiode of the photodetector 12. It should be noted that in order to limit the coupling between the light source and the photodetector, particular attention must be paid during the welding to the alignment between the first optical fiber and the fiber of the second amplifier of the light source and to the occurrence of a modal dismatching.

The diplexer 13 makes it possible to separate the light emitted by the light source and transmitted substantially to the core of the double-clad optical fiber 14, with light propagating, in the opposite direction, in the inner cladding of the double-clad optical fiber 14 to be transmitted to the photodetector 12. This diplexer 13 was obtained, in a manner known per se, by melting-drawing of the double-clad optical fiber 14 and the second multimode optical fiber $13_2$, so as to form a coupler. The principle of manufacturing such a coupler is for example described in the document by Madore, W. J., De Montigny, E, Ouellette, O., Lemire-Renaud, S., Leduc, M., Daxhelet, X., . . . & Boudoux, C. (2013). Asymmetric double-clad fiber couplers for endoscopy. *Optics letters*, 38(21), 4514-4517. In other embodiments, mirrors and/or refractive or diffractive elements may be used.

It should be noted that the diplexer 13 is advantageously designed to present:

low losses, preferably less than 0.01% power loss during the transmission of light propagating in the core of the first optical fiber to the core of the double-clad optical fiber and therefore a significant isolation between the cladding of the double-clad optical fiber and the first optical fiber;

less than 50% loss of power at the coupling between the inner cladding of the double-clad optical fiber 14 and the second multimode optical fiber $13_2$.

The diplexer can also be obtained by constructing a circulator such that the input port is connected to the laser source, the common port is made of double-clad fiber and placed in front of the optical collimation system and the output port is connected to the photodetector.

Furthermore, in order to limit the coupling between the light source and the photodetector, the end of the second optical fiber that is not coupled to the photoreceptor has been polished to minimize the amount of light entering the rangefinder device by this end. In variants of this embodiment of the invention, it may be envisaged to cleave or apply an antireflection treatment to the unused end of the second optical fiber or to make any other known modification to limit the return of light in the rangefinder device via the unused end of the second optical fiber.

Advantageously, the core mode diameter of the double-clad optical fiber 14, was reduced to a diameter less than one micrometer away from that of the output fiber of the laser source. The inner cladding of the double-clad fiber has a diameter equal to 105 µm and the outer cladding has a diameter equal to 200 µm and the numerical aperture of the guide formed by the inner cladding and the outer cladding of this double cladding fiber 14 is equal to 0.2.

In particular variations of this embodiment of the invention, it may be envisaged to implement a double-clad optical fiber with an inner cladding diameter ranging between 80 µm and 1000 µm and with a numerical aperture of 0.1 and 0.3 without departing from the scope of the invention.

Moreover, in this particular embodiment of the invention, the core mode diameter of the second optical fiber is equal to 105 µm and its numerical aperture is 0.22.

As can be seen in FIG. 2, which is a detailed view of the end region of the double optical fiber cladding 14, the end $14_1$ facing the lens 15 is located at the position of the main focus of the lens 15. It is also bevelled at a cleave angle θ relative to a direction perpendicular to its axis which is substantially equal to 8°, in this particular embodiment of the invention. The end $14_1$ of the optical fiber is further advantageously antireflection-treated at 1550 nm so as to reduce the backscattered power by a factor 12.

In this particular embodiment of the invention, the diameter D and the focal length f of the lens 15 have advantageously been selected so that the D/f ratio is substantially equal to twice the numerical aperture of the guide formed by the inner cladding and the outer cladding of the optical fiber double cladding 14. It is thus 0.375 in this particular embodiment of the invention.

Measurements have shown that such a laser rangefinder device has an extinction rate greater than 32 dB and allows rangefinding targets more than 4 km far away.

6.2 Other Optional Features and Advantages of Exemplary Embodiments of the Invention In embodiment variants of the invention detailed above, the following can also be provided:

that the light source of the rangefinder device is a fiber-based laser;

that the peak power of the signal emitted by the laser diode or the fiber-based laser ranges between 500 W and 40 kW;

that the collimating and focusing optical device comprises an aspherical lens.

In another variant, it may be envisaged to implement an optical fiber amplifier, such as for example a doped or semiconductor optical fiber amplifier or a variable attenuator, between said second optical fiber and said photodetector, without departing from the scope of the invention.

In another embodiment variant of the invention described above, it may be provided that the laser light source emits N streams of pulses of duration T1 spaced by a duration T2. In this alternative, the analog-digital processing system provides to a module for controlling the laser source a value of the signal-to-noise ratio calculated from an energy of the detected pulse and from the noise variance and the control module automatically reduces the number N of pulses in the case where the signal-to-noise ratio is sufficient to increase the measuring frequency. If the signal-to-noise ratio is below a predefined threshold, the control module of the laser source increases the number N of pulses automatically remaining under predetermined conditions such as limits of electrical consumption or average power of the rangefinder device, correspond to ocular safety limits, defined for example in the EN60825-1 standard.

An exemplary embodiment of the invention particularly aims to overcome the disadvantages of the state of the art mentioned above.

More precisely, an exemplary embodiment of the invention aims to provide a technical laser rangefinder that presents a significant extinction ratio that may be 31 dB, and a signal-to-noise ratio greater than or equal to 60 dB.

An exemplary embodiment of the invention provides such a laser telemetry technique that allows to implement light sources of suitable power, sufficient to detect objects about 4 kilometres away from the light source.

An exemplary embodiment of the invention provides a laser telemetry technique that has an extinction rate greater than 15 dB or even greater than 30 dB.

An exemplary embodiment of the invention also provides a technique that is simple to implement, and with reduced cost.

An exemplary embodiment of the invention provides a reliable technical solution.

Although the present disclosure has been described with reference to one or more examples, workers skilled in the art will recognize that changes may be made in form and detail without departing from the scope of the disclosure and/or the appended claims.

The invention claimed is:

1. A monostatic laser rangefinder device comprising:
   a laser light source;
   a photodetector;
   a double-clad optical fiber coupled to an optical device arranged to collimate an outgoing beam and focus a beam entering said laser rangefinder device, said double-clad optical fiber having a core of average refractive index $n_1$, an inner cladding of refractive index $n_2$, an outer cladding of refractive index $n_3$, where $n_1 < n_2 < n_3$;
   an optical fiber diplexer configured to separate light emitted by said light source, transmitted to the core of said double-clad optical fiber, from light propagating in the inner cladding of said double-clad optical fiber, transmitted to said photodetector, comprising;
      a first optical fiber forming an input port of said diplexer,
      a second optical fiber forming a first output port of said diplexer, said second optical fiber being multimode,
      said first optical fiber being coupled to said laser source, said second optical fiber being coupled to said photodetector, and said double-clad optical fiber forming a second output port of said diplexer;
   a processing system, which processes current generated by said photodetector from light received by said photodetector to provide a distance from said generated current;
   wherein a numerical aperture of a light guide formed of the inner cladding and the outer cladding of the double-clad fiber is less than or equal to 0.5 and greater than 0.1 and wherein an end of said double-clad fiber facing said collimating and focusing optical device has a face inclined with respect to an axis perpendicular to an axis of the double-clad fiber by an angle greater than or equal to half of the arcsine of said numerical aperture.

2. The monostatic laser rangefinder device according to claim 1, wherein said angle is greater than or equal to 8°.

3. The monostatic laser rangefinder device according to claim 1, wherein said numerical aperture is less than 0.22 and said angle is greater than or equal to 6.5°.

4. The monostatic laser rangefinder device according to claim 1, wherein said end of said double-clad optical fiber is cleaved or polished, or is formed of a connector mounted on said double-clad optical fiber.

5. The monostatic laser rangefinder device according to claim 1, wherein said photodetector comprises a current limiter, which limits the generated current.

6. The monostatic laser rangefinder device according to claim 1, wherein said processing system is configured to subtract from the current generated by said photodetector a predefined current value belonging to the group consisting of:
   a constant current value;
   a current value proportional to the current generated by spurious reflections.

7. The monostatic laser rangefinder device according to claim 1, wherein said optical collimation device comprises a thin lens, an aspheric lens or a diffractive optical element.

8. The monostatic laser rangefinder device according to claim 1, wherein said laser light source comprises at least one laser diode capable of emitting light pulses in the wavelength band from 1530 to 1600 nm.

9. The monostatic laser rangefinder device according to claim 1, wherein said photodetector comprises a photodiode which is fiber-based with a multimode fiber, operating in photoconductive mode or in avalanche mode.

10. The monostatic laser rangefinder device according to claim 1, wherein said end of said double-clad optical fiber is antireflection-treated for emission wavelength(s) of said laser light source.

11. The monostatic laser rangefinder device according to claim 1, wherein said double-clad optical fiber is melt-stretched with said second optical fiber to form a coupler of the diplexer.

12. The monostatic laser rangefinder device according to claim 1, wherein said laser light source is arranged to emit streams of a number N of pulses per burst and comprises a controller of said laser light source configured to automatically reduce the number N of pulses in the case where the signal-to-noise ratio calculated by said processing system is greater than a first predetermined threshold for increasing the measurement frequency, and so as to increase automatically the number N of pulses within limits of specifications required to guarantee eye safety conditions, in the case where said signal-to-noise ratio is less than or equal to a second predetermined threshold.

13. The monostatic laser rangefinder device according to claim 1, wherein the photodetector comprises a photodiode and a transimpedance amplifier circuit comprising an operational amplifier, which amplifies a current generated by the photodiode, and wherein an output of the transimpedance amplifier circuit is coupled to the processing system.

14. The monostatic laser rangefinder device according to claim 1, wherein the numerical aperture of the light guide formed of the inner cladding and the outer cladding of the double-clad fiber is less than or equal to 0.3.

* * * * *